(12) United States Patent
Viller (10) Patent No.: US 9,315,073 B2
(45) Date of Patent: Apr. 19, 2016

(54) TIRE FOR HEAVY VEHICLES, COMPRISING A LAYER OF CIRCUMFERENTIAL REINFORCING ELEMENTS CONSISTING OF A CENTRAL PART AND TWO AXIALLY EXTERNAL PARTS

(75) Inventor: Jean-Marc Viller, Riom (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 601 days.

(21) Appl. No.: 13/515,200

(22) PCT Filed: Dec. 9, 2010

(86) PCT No.: PCT/EP2010/069275
§ 371 (c)(1),
(2), (4) Date: Oct. 2, 2012

(87) PCT Pub. No.: WO2011/070111
PCT Pub. Date: Jun. 16, 2011

(65) Prior Publication Data
US 2013/0186543 A1    Jul. 25, 2013

(30) Foreign Application Priority Data

Dec. 10, 2009 (FR) ...................................... 09 58835

(51) Int. Cl.
*B60C 9/22* (2006.01)
*B60C 9/02* (2006.01)
(Continued)

(52) U.S. Cl.
CPC ............. *B60C 9/0238* (2013.04); *B60C 9/1821* (2013.04); *B60C 9/2006* (2013.04); *B60C 9/22* (2013.01); *B60C 2009/2041* (2013.04);
(Continued)

(58) Field of Classification Search
CPC ...... B60C 9/22; B60C 9/2204; B60C 9/1821; B60C 2009/2209–2009/2295; Y10T 152/10513; Y10T 152/10783
USPC .................................. 152/531, 458, 527, 533
See application file for complete search history.

(56) References Cited

U.S. PATENT DOCUMENTS 3,570,574 A    3/1971   Marker et al.
3,990,493 A    11/1976  Caretta
(Continued)

FOREIGN PATENT DOCUMENTS

CN    1185131    6/1998
CN    1822963    8/2006
(Continued)

*Primary Examiner* — Adrienne C Johnstone
(74) *Attorney, Agent, or Firm* — Cozen O'Connor (57) ABSTRACT

The invention relates to a tire comprising at least two working layers (41, 43) and at least one layer of circumferential metal reinforcing elements (42). According to the invention, the layer of circumferential reinforcing elements consists of at least one central part (422) and two axially external parts (421), the reinforcing elements of the central part of at least one layer of circumferential reinforcing elements being reinforcing elements cut so as to form sections (6), the length of the sections being less than 550 mm, the distance (d) between the ends of two consecutive sections being greater than 25 mm, the length of the sections being between 1.1 and 13 times the distance between the ends of two consecutive sections and the reinforcing elements of the two axially external parts (421) being continuous.

14 Claims, 5 Drawing Sheets

(51) Int. Cl.
   *B60C 9/18* (2006.01)
   *B60C 9/20* (2006.01)

(52) U.S. Cl.
   CPC . *B60C2009/2214* (2013.04); *B60C 2009/2261* (2013.04); *B60C 2009/2295* (2013.04); *B60C 2200/06* (2013.04); *Y10T 152/10513* (2015.01); *Y10T 152/10783* (2015.01)

(56) References Cited

U.S. PATENT DOCUMENTS

| | | | | |
|---|---|---|---|---|
| 4,293,019 A | * | 10/1981 | Maiocchi | 152/531 X |
| 4,791,973 A | * | 12/1988 | Davisson | 152/531 X |
| 5,738,740 A | * | 4/1998 | Cluzel | 152/531 X |
| 5,746,853 A | * | 5/1998 | Burlacot | 152/531 |
| 6,082,425 A | * | 7/2000 | Colom | 152/531 X |
| 6,082,426 A | * | 7/2000 | Colom | 152/531 X |
| 6,668,889 B1 | * | 12/2003 | Losey et al. | 152/533 X |
| 6,935,393 B2 | | 8/2005 | Ghislain Constant | |
| 7,252,128 B2 | * | 8/2007 | Ferlin | 152/531 X |
| 2010/0024946 A1 | * | 2/2010 | Yoshikawa et al. | 152/531 |

FOREIGN PATENT DOCUMENTS

| | | |
|---|---|---|
| EP | 1 526 003 | 4/2005 |
| FR | 2013812 | 4/1970 |
| WO | WO 99/24269 | 5/1999 |
| WO | WO 2005/016668 | 2/2005 |

\* cited by examiner

TIRE FOR HEAVY VEHICLES, COMPRISING A LAYER OF CIRCUMFERENTIAL REINFORCING ELEMENTS CONSISTING OF A CENTRAL PART AND TWO AXIALLY EXTERNAL PARTS

RELATED APPLICATIONS

This is a U.S. national stage of application No. PCT/EP2010/069275, filed on Dec. 9, 2010. Priority is claimed on the following application: French Application No.: 09/58835 filed on Dec. 10, 2009, the content of which is hereby incorporated here by reference.

FIELD OF THE INVENTION

The present invention relates to a tire with a radial carcass reinforcement and more particularly to a tire intended to be fitted to vehicles that carry heavy loads and drive at sustained speed, such as, for example, lorries, tractors, trailers or road buses.

BACKGROUND OF THE INVENTION

In general, in tires of the heavy goods vehicle type, the carcass reinforcement is anchored on each side in the region of the bead and is surmounted radially by a crown reinforcement consisting of at least two superposed layers formed of threads or cords which are parallel within each layer and crossed from one layer to the next making angles of between 10° and 45° with the circumferential direction. The said working layers, which form the working reinforcement, may also be covered with at least one layer known as a protective layer which is formed of reinforcing elements that are advantageously metal and extensible, known as elastic elements. It may also comprise a layer of metal cords or threads of low extensibility making an angle of between 45° and 90° with the circumferential direction, this ply, known as the triangulation ply, being situated radially between the carcass reinforcement and the first crown ply known as the working crown ply, formed of parallel threads or cords making angles at most equal to 45° in absolute value. The triangulation ply, together with at least the said working ply, forms a triangulated reinforcement which, under the various stresses it encounters, deforms very little, the triangulation ply having the essential role of reacting transverse compressive forces to which all of the reinforcing elements in the crown region of the tire are subjected.

In the case of tires for heavy goods vehicles, just one protective layer is usually present and its protective elements are usually oriented in the same direction and at the same angle in terms of absolute value as those of the reinforcing elements of the radially outermost, and therefore radially adjacent, working layer. In the case of construction plant tires intended to run over somewhat uneven ground, the presence of two protective layers is advantageous, the reinforcing elements being crossed from one layer to the next and the reinforcing elements of the radially inner protective layer being crossed with the inextensible reinforcing elements of the working layer radially on the outside of and adjacent to the said radially inner protective layer.

Cords are said to be inextensible when the said cords under a tensile force equal to 10% of the rupture force, exhibit a strain of at most 0.2%.

Cords are said to be elastic when the said cords are under a tensile force equal to the rupture load exhibit a strain of at least 3% with a maximum tangent modulus of less than 150 GPa.

Circumferential reinforcing elements are reinforcing elements which make, with the circumferential direction, angles contained in the range +8°, −8° about 0°.

The circumferential, or longitudinal, direction of the tire is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it turns during normal use.

A radial or meridian plane is a plane containing the axis of rotation of the tire.

The circumferential median plane, or equatorial plane, is a plane perpendicular to the axis of rotation of the tire and which divides the tire into two halves.

As far as the metal cords or threads are concerned, the rupture force (maximum load in N), rupture strength (in MPa) and elongation at break (total elongation in %) measurements are taken under tensile load in accordance with standard ISO 6892, 1984.

Certain present-day tires known as "road" tires are intended to run at high speed over increasingly long journeys, because of the improvements to the road network and the growth of the motorway network throughout the world. All of these conditions in which such a tire has to run undoubtedly allows an increase in the distance that the tire can cover, since tire wear is lower, but tire endurance and in particular crown reinforcement endurance is penalized.

This is because there are stresses in the crown reinforcement, particularly shear stresses between the crown layers, combined with a not-insignificant increase in the operating temperature at the ends of the axially shortest crown layer, and these cause cracks to appear and spread through the rubber at the said ends. The same problem is encountered at the edges of two layers of reinforcing elements, the said other layer not necessarily having to be radially adjacent to the first.

To improve the endurance of the crown reinforcement of the type of tire being considered here, solutions relating to the structure and quality of the layers and/or profiled elements made of rubber compound which are positioned between and/or around the ends of plies and more particularly the ends of the axially shortest ply have already been supplied.

Patent FR 1 389 428, to improve resistance to degradation of the rubber compounds located near the crown reinforcement edges, recommends the use, in combination with a low-hysteresis tread, of a rubber profiled element that covers at least the sides and marginal edges of the crown reinforcement and consists of a low-hysteresis rubber compound.

Patent FR 2 222 232, to avoid separation between crown reinforcement plies, teaches the coating of the ends of the reinforcement in a cushion of rubber the Shore A hardness of which differs from that of the tread surmounting the said reinforcement, and higher than the Shore A hardness of the profiled element of rubber compound positioned between the edges of crown reinforcement and carcass reinforcement plies.

French application FR 2 728 510 proposes positioning, on the one hand between the carcass reinforcement and the carcass reinforcement working ply radially closest to the axis of rotation, an axially continuous ply formed of inextensible metal cords that make an angle at least equal to 60° with the circumferential direction and the axial width of which is at least equal to the axial width of the shortest working crown ply and, on the other hand, between the two working crown plies an additional ply formed of metal elements directed substantially parallel to the circumferential direction.

Prolonged running under particularly arduous conditions of tires built in this way have revealed limits in terms of the endurance of these tires.

In order to address such disadvantages and improve the endurance of the crown reinforcement of these tires, it has been proposed for at least one additional layer of reinforcing elements substantially parallel to the circumferential direction to be combined with the working crown layers. French application WO 99/24269 notably proposes, on each side of the equatorial plane and in the immediate axial continuation of the additional ply of reinforcing elements substantially parallel to the circumferential direction, that the two working crown plies formed of reinforcing elements that are crossed from one ply to the next be coupled over a certain axial distance and then later uncoupled using profiled elements of rubber compound over at least the remainder of the width common to the said two working plies.

The layer of circumferential reinforcing elements usually consists of at least one metal cord wound to form a turn laid with respect to the circumferential direction at an angle of less than 8°.

The results obtained in terms of endurance and wear in prolonged road running at high speed are satisfactory. However, it would seem that the same vehicles sometimes have to drive on untarmaced roads or tracks, for example in order to get to a construction site or an unloading area. Running on such terrain is done at low speed but the tires, particularly their treads, are subject to attack for example on account of the presence of stones which greatly impair the performance in terms of tire wear.

SUMMARY OF THE INVENTION

It is an object of the invention to provide tires for heavy goods vehicles the endurance and wear performance of which is maintained for road use and the wear performance of which is improved for use on unmade-up roads.

This object is achieved according to one aspect of the invention directed to a tire with radial carcass reinforcement comprising a crown reinforcement formed of at least two working crown layers of inextensible reinforcing elements, crossed from one layer to the other and making angles of between 10° and 45° with the circumferential direction, and itself radially capped by a tread, the said tread being connected to two beads by two sidewalls, the crown reinforcement comprising at least one layer of circumferential metal reinforcing elements, the said layer of circumferential reinforcing elements consisting of at least one central part and two axially outer parts, the reinforcing elements of the central part of the said at least one layer of circumferential reinforcing elements being reinforcing elements that are cut into sections, the length of the sections being less than 550 mm, the distance between the ends of two consecutive sections being greater than 25 mm, the length of the sections being between 1.1 and 13 times the distance between the ends of two consecutive sections, and the reinforcing elements of the two axially outer parts being continuous.

The tire thus defined maintains satisfactory properties in high-speed road running and also displays performance in terms of resistance to wear and more specifically in terms of resistance to attack that is a marked improvement over known tires.

The inventors have indeed been able to demonstrate that the attacks made by non-asphalted roads affect essentially the central part of the tire tread, that part apparently always being the most exposed.

The tire as defined according to the invention leads to a softening in the radial direction of the axially central part of the tire notably because of the lower circumferential rigidity of this central region of the tire associated with the presence of circumferential reinforcing elements that are cut. This softening, in the light of the results obtained, leads to absorption of the attacks made on the tread by obstacles such as stones present on the ground over which the vehicle is driving.

The inventors have also been able to demonstrate that the reduction in the rigidity of the central region of the tire allows a change to the shape of the contact patch where the tire makes contact with the ground thus further improving wear performance on asphalted roads. Specifically, the crown reinforcement according to the invention encourages a near-rectangular footprint by limiting the extent to which the said footprint appears concave in the axial direction.

One advantageous alternative form of embodiment of the invention is that the length of the sections is less than 300 mm, and that the length of the sections is less than 6.5 times the distance between the ends of two consecutive sections.

Advantageously also according to an embodiment of the invention, the length of the sections is less than 260 mm and the length of the sections is less than 3.5 times the distance between the ends of two consecutive sections.\

Advantageously also, the distance between the ends of two sections is greater than 35 mm.

According to one preferred embodiment of the invention, notably to ensure minimum circumferential rigidity, the length of the sections is greater than 95 mm.

For the same reason, for preference also, the distance between the ends of two consecutive sections is less than 175 mm.

The rigidity of the reinforcing elements of the central part has notably to be high enough to provide the tire with satisfactory hooping in this central part so that it can withstand the stresses imposed notably during inflation or when driving at high speed and limit the circumferential expansion of the crown reinforcement.

These values also encourage good cohesion of the tire crown reinforcement assembly as a whole, particularly in its central part. These values also encourage the layer of circumferential reinforcing elements to contribute towards guarding against attack of the puncturing type. Specifically, these values encourage a compromise between the softening of the crown that allows the tread to absorb attack and a protective role should the said tread become punctured.

According to an advantageous alternative form of embodiment of the invention, the layer of circumferential reinforcing elements has an axial width greater than 0.5×S.

S is the maximum axial width of the tire when this tire is mounted on its service rim and inflated to its recommended pressure.

The axial widths of the layers of the reinforcing elements are measured on a cross section of a tire, the tire therefore being in an uninflated state.

According to one preferred alternative form of embodiment of the invention, the axial width of the central part of the layer of circumferential reinforcing elements is greater than 0.15×S and less than 0.5×S.

Advantageously also according to the invention, the axial width of each of the axially outer parts of the layer of circumferential reinforcing elements is less than 0.45×S.

According to an alternative form of embodiment of the invention, transition regions are advantageously provided between the central part and the axially outer parts such that each of the transition regions comprise at least one metal reinforcing element the width, measured in the axial direction, of the said transition regions being at least equal to 1.5 mm.

Such transition regions will notably make it possible to limit the appearance of regions of excess tension in the axially innermost cord of the axially outer parts of the layer of circumferential reinforcing elements in the regions facing the ends of the axially outermost sections of the central part.

For preference, according to this embodiment, the width, measured in the axial direction, of the said transition regions is at most equal to 7 mm.

According to this embodiment, when the transition regions comprise a metal reinforcing element, this element makes an angle with the circumferential direction that is advantageously between 0.2 and 4°.

Advantageously also according to this embodiment, notably when the tire is intended to be fitted to the steering axle of a vehicle and its tread comprises at least one circumferential rib, the lateral edges of these transition regions are distant from the axial ends, at the tread surface of the said rib, by a distance, measured in the axial direction, of at least 4 mm. When one edge of a rib is rounded, the axial ends are defined by the intersection of the gradient of the groove formed by the rib and the tangent to the upper face of the rib.

According to other alternative forms of embodiment of the invention, transition regions are advantageously provided between the central part and the axially outer parts such that the said transition regions have circumferential rigidities that are intermediate between those of the central part and of the axially outer parts. These transition regions preferably have a small axial width and provide any progressive transition between the circumferential rigidities of the central part and of the axially outer parts. The width of the said transition region is advantageously between 1.25 and 3.75 times the spacing at which the circumferential reinforcing elements are laid in the axially outer parts.

Within the meaning of the invention, the spacing in part of the layer of circumferential reinforcing elements is the distance between two consecutive reinforcing elements. It is measured between the longitudinal axes of the said reinforcing elements in a direction perpendicular to at least one of the said longitudinal axes. It is therefore measured in a substantially axial direction.

The rigidity gradient from the axially outer parts to the central part is advantageously obtained with transition regions consisting of circumferential reinforcing elements that are cut to form sections the length of which is greater than that of the sections of the central part and/or with a distance between the ends of two consecutive sections that is less than that between two sections of the central part.

Advantageously also, according to a first embodiment, the circumferential length of the sections decreases from the axially outer edge of a transition region towards the axially inner edge thereof.

According to a second embodiment, the distance between the ends of two consecutive sections increases from the axially outer edge of a transition region towards the axially inner edge thereof.

According to a third embodiment of the invention, a reduction in the circumferential length of the sections is combined with an increase in the distance between the ends of two consecutive sections, from the axially outer edge of a transition region towards the axially inner edge thereof.

According to an alternative form of embodiment of the invention, a reduction in the circumferential length of the sections and/or an increase in the distance between the ends of two consecutive sections from the edges of the central part towards the centre thereof is/are planned.

Other alternative forms still plan for the circumferential reinforcing elements to be laid with a different spacing in the central part and in the axially outer parts. To encourage lower circumferential rigidity in the central part of the layer of circumferential reinforcing elements, the spacing is advantageously greater in the said central part. Its value advantageously does not exceed 1.5 times the value of the spacing in the axially outer parts, and more preferably still does not exceed 1.25 times the value of the spacing in the axially outer parts.

Advantageously also, when the spacing varies between the axially outer parts and the central part and the layer of circumferential reinforcing elements comprises transition regions, the spacing at which the circumferential reinforcing elements in the transition region are laid is of a value comprised between that of the axially outer parts and that of the central part.

One preferred embodiment of the invention is that two consecutive, or axially adjacent, circumferential reinforcing elements, of the central part, and possibly of the transition regions, which consist of reinforcing elements that are cut to form sections, do not have regions of cutting that axially face one another. More specifically, the regions of cuts between sections are preferably not axially adjacent and are therefore circumferentially offset.

Advantageously according to this embodiment, the ends of two adjacent sections are separated from one another in the longitudinal direction by a distance greater than 0.1 times the length of that section which has the shortest length measured in the longitudinal direction.

The invention also advantageously plans for at least one layer constituting the crown reinforcement to be present radially under the axially outermost "rib" or tread block of longitudinal main orientation. This embodiment as previously stated enhances the rigidity of the said tread block. Advantageously also, the layer of circumferential reinforcing elements is present radially under the axially outermost "rib" or tread block of longitudinal main orientation.

According to one preferred embodiment of the invention, at least two working crown layers have different axial widths, the difference between the axial width of the axially widest working crown layer and the axial width of the axially narrowest working crown layer being between 10 and 30 mm.

For preference also, the axially widest working crown layer is radially on the inside of the other working crown layers.

According to one preferred embodiment of the invention, the layer of circumferential reinforcing elements is arranged radially between two working crown layers.

Advantageously also according to one embodiment of the invention, the axial widths of the working crown layers radially adjacent to the layer of circumferential reinforcing elements are greater than the axial width of the said layer of circumferential reinforcing elements and, for preference, the said working crown layers adjacent to the layer of circumferential reinforcing elements are on each side of the equatorial plane and in the immediate axial continuation of the layer of circumferential reinforcing elements, coupled over an axial width, and then later uncoupled by profiled elements of rubber compound at least over the remainder of the width common to the said two working layers.\

Within the meaning of the invention, layers which are coupled are layers the respective reinforcing elements of which are radially separated by at most 1.5 mm, the said thickness of rubber being measured radially between the respectively upper and lower generatrices of the said reinforcing elements.

The presence of such couplings between the working crown layers adjacent to the layer of circumferential reinforcing elements allows a reduction in tensile stresses acting on the axially outermost circumferential elements located closest to the coupling.

The thickness of the uncoupling profiled elements between the working plies, measured at the ends of the narrowest working ply, will be at least equal to two millimeters and preferably greater than 2.5 mm.

According to a first alternative form of embodiment of the invention, the circumferential reinforcing elements of the central part of at least one layer of circumferential reinforcing elements are inextensible metal reinforcing elements. This alternative form of embodiment of the invention is particularly advantageous from an economic standpoint, this type of reinforcing element being inexpensive.

According to another alternative form of embodiment of the invention, the circumferential reinforcing elements of the central part of at least one layer of circumferential reinforcing elements are elastic metal reinforcing elements. Such an alternative form of embodiment of the invention may have the advantage of making producing the layer of circumferential reinforcing elements easier, as the same reinforcing elements can be used for the three axial parts of the said layer of circumferential reinforcing elements. A system for cutting the reinforcing elements being rendered operational only for the central part when laying the circumferential reinforcing elements.

According to one advantageous embodiment of the invention, at least the reinforcing elements of the two axially outer parts of at least one layer of circumferential reinforcing elements are metal reinforcing elements having a secant modulus of 0.7% elongation of between 10 and 120 GPa and a maximum tangent modulus of less than 150 GPa.

According to a preferred embodiment, the secant modulus of the reinforcing elements at 0.7% elongation is less than 100 GPa and greater than 20 GPa, preferably comprised between 30 and 90 GPa and more preferably still, less than 80 GPa.

For preference also, the maximum tangent modulus of the reinforcing elements is less than 130 GPa and more preferably still, less than 120 GPa.

The modulus values given hereinabove are measured on a curve of tensile stress against elongation performed with a preload of 20 MPa with respect to the cross section of metal of the reinforcing element, the tensile stress corresponding to a measured tension divided by the cross section of metal of the reinforcing element.

The modulus values for the same reinforcing elements can be measured on a curve of tensile stress against elongation that is determined with a preload of 10 MPa divided by the overall cross section of the reinforcing element, the tensile stress corresponding to a measured tension divided by the overall cross section of the reinforcing element. The overall cross section of the reinforcing element is the cross section of a composite element made up of metal and of rubber, the latter notably having penetrated the reinforcing element during the tire curing phase.

Using this formulation relating to the overall cross section of the reinforcing element, the reinforcing elements of the axially outer parts and of the central part of at least one layer of circumferential reinforcing elements are metal reinforcing elements with a secant modulus of 0.7% elongation of between 5 and 60 GPa and a maximum tangent modulus of less than 75 GPa.

According to a preferred embodiment, the secant modulus of the reinforcing elements of 0.7% elongation is less than 50 GPa and greater than 10 GPa, preferably between 15 and 45 GPa and more preferably still, less than 40 GPa.

For preference also, the maximum tangent modulus of the reinforcing elements is less than 65 GPa and more preferably still, less than 60 GPa.

According to a preferred embodiment, at least the reinforcing elements of the two axially outer parts of at least one layer of circumferential reinforcing elements are metal reinforcing elements having a tensile stress-strain curve that exhibits shallow gradients for small elongations and a substantially constant and steep gradient for greater elongations. Such reinforcing elements of the additional ply are commonly termed "bi-modulus" elements.

According to a preferred embodiment of the invention, the substantially constant and steep gradient appears from a relative elongation of between 0.1% and 0.5%.

The various characteristics of the reinforcing elements which have been listed hereinabove are measured on reinforcing elements that have been taken from tires.

Reinforcing elements more particularly suited to the production of at least one layer of circumferential reinforcing elements according to the invention are, for example, to assemblies of formula 21.23, the construction of which is $3\times(0.26+6\times0.23)$ 4.4/6.6 SS; this stranded rope consists of 21 elementary threads of formula $3\times(1+6)$, with three strands twisted together and each consisting of seven threads, one thread forming a central core of diameter equal to 26/100 mm and six wound threads of diameter equal to 23/100 mm. Such a cord has a secant modulus of 0.7% of 45 GPa and a maximum tangent modulus of 98 GPa, these being measured on a curve of tension against elongation that has been determined with a preload of 20 MPa divided by the cross section of metal of the reinforcing element, the tensile stress corresponding to a measured tension divided by the cross section of metal of the reinforcing element. On a curve of tensile stress against elongation determined with a preload of 10 MPa divided by the overall cross section of the reinforcing element, the tensile stress corresponding to a measured tension divided by the overall cross section of the reinforcing element, this cord of formula 21.23 has a secant modulus of 0.7% of 23 GPa and a maximum tangent modulus of 49 GPa.

Likewise, another example of reinforcing elements is an assembly of formula 21.28, the construction of which is $3\times(0.32+6\times0.28)$ 6.2/9.3 SS. This cord has a secant modulus of 0.7% equal to 56 GPa and a maximum tangent modulus of 102 GPa, both measured on a curve of tensile stress as a function of elongation determined with a preload of 20 MPa divided by the cross section of metal of the reinforcing element, the tensile stress corresponding to a measured tension divided by the cross section of metal of the reinforcing element. On a curve of tensile stress against elongation determined with a preload of 10 MPa divided by the overall cross section of the reinforcing element, the tensile stress corresponding to a measured tension divided by the overall cross section of the reinforcing element, this cord of formula 21.28 has a secant modulus of 0.7% of 27 GPa and a maximum tangent modulus of 49 GPa.

The use of such reinforcing elements in at least the two axially outer parts of at least one layer of circumferential reinforcing elements notably makes it possible to maintain satisfactory layer rigidities even after the shaping and curing steps encountered in conventional manufacturing methods.

The metal elements are preferably steel cords.

An embodiment of the invention advantageously also provides for reducing the tensile stresses acting on the axially outermost circumferential elements that the angle made by the reinforcing elements of the working crown layers with the circumferential direction be less than 30° and preferably less than 25°.

According to another advantageous alternative form of embodiment of the invention, the working crown layers comprise reinforcing elements that are crossed from one ply to the other and make with the circumferential direction angles that can vary in the axial direction, the said angles being greater on the axially outer edges of the layers of reinforcing elements by comparison with the angles that the said elements make when measured at the circumferential median plane. Such an embodiment of the invention allows the circumferential rigidity to be increased in certain regions while at the same time reducing it in others, notably in order to reduce the compression to which the carcass reinforcement is subjected.

One preferred embodiment of the invention is also to provide that the crown reinforcement is supplemented radially on the outside by at least one additional layer, known as a protective layer, of reinforcing elements said to be elastic reinforcing elements, which are directed with respect to the circumferential direction at an angle of between 10° and 45° and in the same direction as the angle formed by the inextensible elements of the working layer radially adjacent to it.

The protective layer may have an axial width smaller than the axial width of the narrowest working layer. The said protective layer may also have an axial width greater than the axial width of the narrowest working layer, such that it overlaps the edges of the narrowest working layer and, when it is the layer radially above that is the narrowest, such that it is coupled, in the axial continuation of the additional reinforcement, to the widest working crown layer over an axial width in order thereafter, axially on the outside, to be decoupled from the said widest working layer by profiled elements at least 2 mm thick. The protective layer formed of elastic reinforcing elements may, in the abovementioned scenario, be on the one hand possibly uncoupled from the edges of the said narrowest working layer by profiled elements of a thickness appreciably less than the thickness of the profiled elements that separate the edges of the two working layers and, on the other hand, have an axial width less than or greater than the axial width of the widest crown layer.

According to any one of the embodiments of the invention mentioned above, the crown reinforcement may further be supplemented, radially on the inside between the carcass reinforcement and the radially inner working layer closest to the said carcass reinforcement, by a triangulation layer of inextensible metal reinforcing elements made of steel which, with the circumferential direction, make an angle greater than 45° and in the same direction as the angle formed by the reinforcing elements of the layer radially closest to the carcass reinforcement.

BRIEF DESCRIPTION OF THE DRAWINGS

Other details and advantageous features of the invention will emerge hereinbelow from the description of the exemplary embodiments of the invention given with reference to FIGS. 1 to 5 which depict.

In order to make them easier to understand, the figures are not drawn to scale. The figures depict only half a tire which continues symmetrically on the other side of the axis XX' that represents the circumferential median plane, or equatorial plane, of a tire.

DETAILED DESCRIPTION OF THE DRAWINGS

Figure 1:
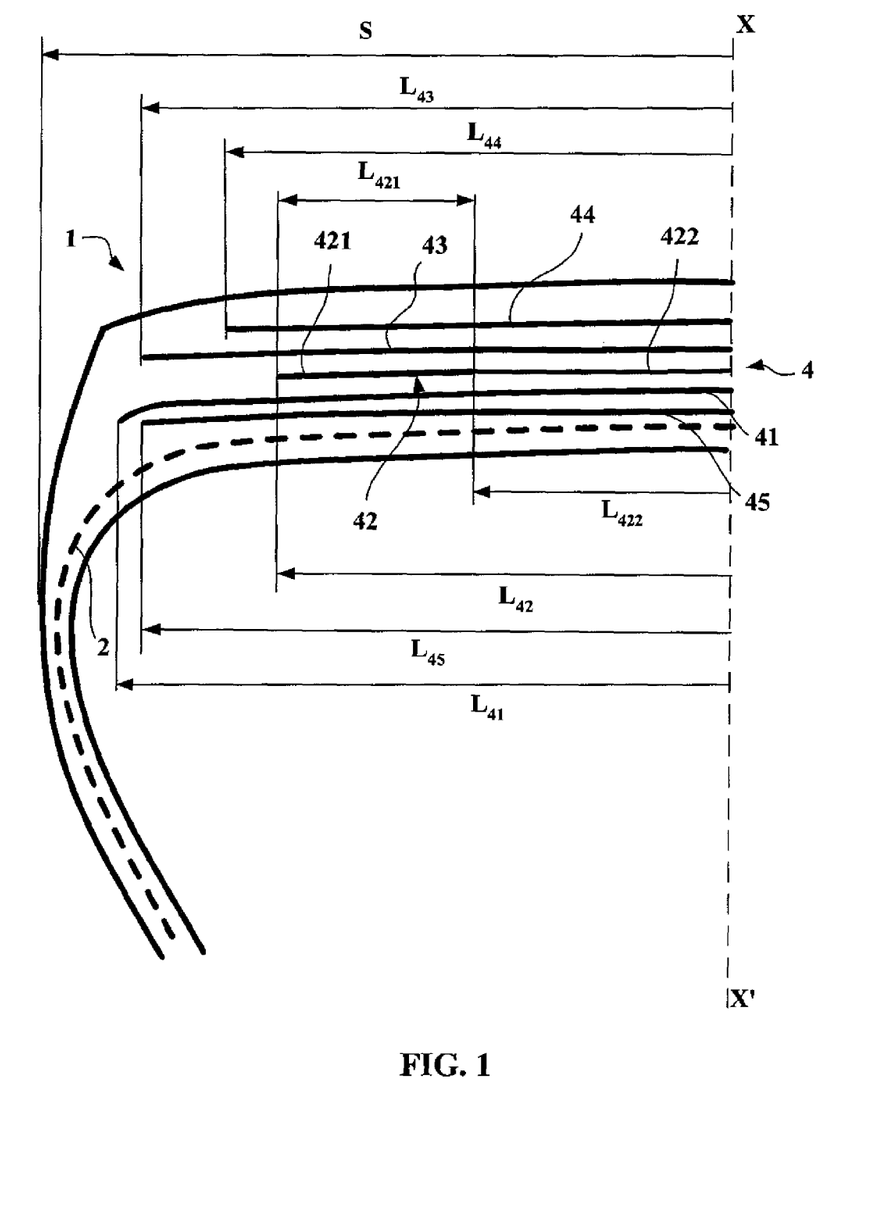
FIG. 1: a meridian diagrammatical view of a tire according to the invention.

In FIG. 1, the tire 1 of size 455/45 R 22.5, has an aspect ratio H/S of 0.45, H being the height of the tire 1 on its mounting rim and S its maximum axial width. The said tire 1 comprises a radial carcass reinforcement 2 anchored in two beads, not depicted in FIG. 1. The carcass reinforcement is formed of a single layer of metal cords. This carcass reinforcement 2 is hooped by a crown reinforcement 4, formed radially from the inside outwards:

of a layer of reinforcing elements 45, known as the triangulation layer, formed of inextensible unwrapped 9.28 metal cords which are continuous across the entire width of the ply, directed at an angle of 50°, of a first working layer 41 formed of inextensible unwrapped 11.35 metal cords which are continuous across the entire width of the ply and directed at an angle of 18°, of a layer of circumferential reinforcing elements 42 formed of 21×28 steel metal cords, of the "bi-modulus" type, consisting of three parts, these being two axially outer parts 421 and one central part 422, of a second working layer 43 formed of inextensible unwrapped 11.35 metal cords which are continuous across the entire width of the ply, directed at an angle equal to 18° and which cross with the metal cords of the layer 41, of a protective layer 44 formed of elastic 18×23 metal cords directed at an angle of 18° in the same direction as the reinforcing elements of the working layer 43.

The crown reinforcement is itself capped by a tread 6.

The maximum axial width S of the tire is equal to 458 mm.

The axial width $L_{45}$ of the triangulation layer 45 is equal to 382 mm.

The axial width $L_{41}$ of the first working layer 41 is equal to 404 mm.

The axial width $L_{43}$ of the second working layer 38 is equal to 380 mm. The difference between the widths $L_{41}$ and $L_{43}$ is equal to 24 mm.

As for the overall axial width $L_{42}$ of the layer of circumferential reinforcing elements 42, this is equal to 304 mm. The axially outer parts 421 have a width $L_{421}$ of 61 mm, which is therefore less than 45% of S.

The width of the central part $L_{422}$ is equal to 182 mm.

The last crown ply 44, known as the protective ply, has a width $L_{44}$ equal to 338 mm.

Figure 2:
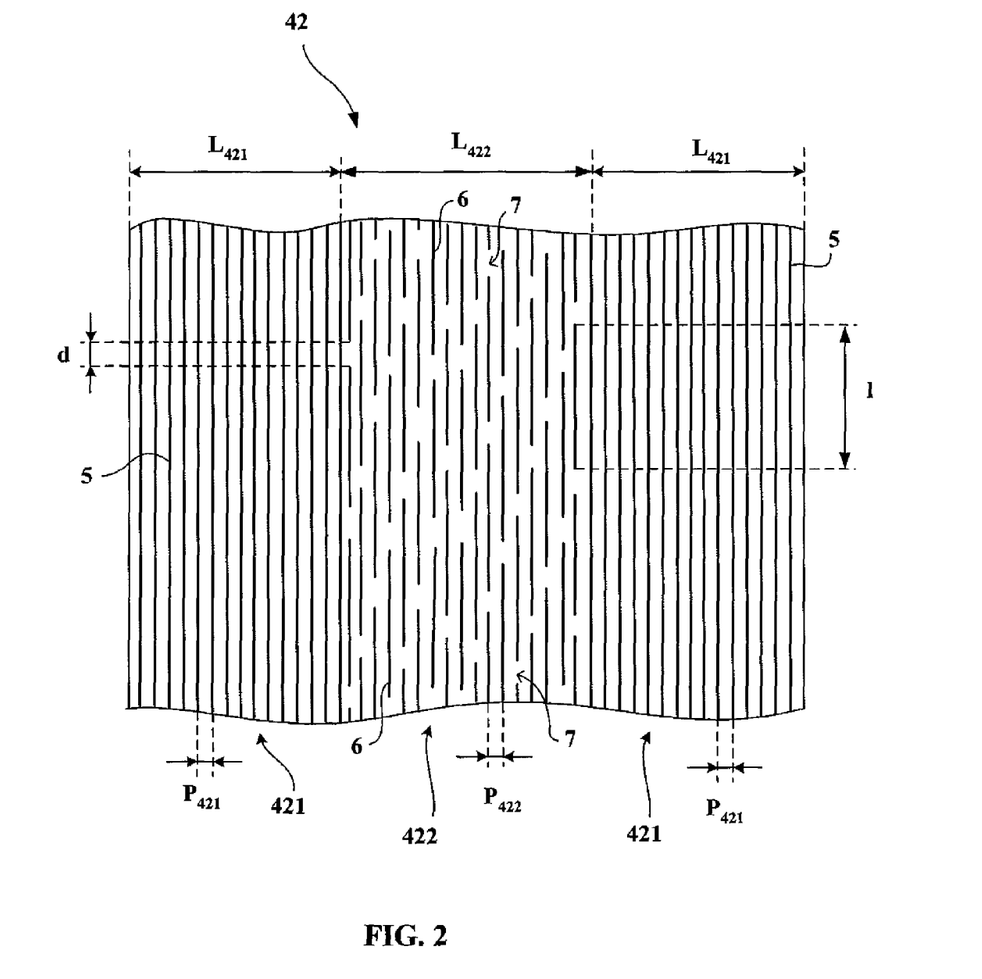
FIG. 2: a schematic depiction of one layer of circumferential reinforcing elements of the tire of FIG. 1.

FIG. 2 illustrates a first embodiment of a layer of circumferential reinforcing elements 42 according to the invention, corresponding to FIG. 1. As stated previously, this layer 42 consists of a central part 421 and of two axially outer parts 421.

The circumferential reinforcing elements 5 are laid at a constant spacing P of 2.3 mm across the entire axial width of the layer of circumferential reinforcing elements 42.

In the central part, the circumferential reinforcing elements are cut to form sections 6, having a length equal to 101 mm. Two sections are separated by a gap 7 of which the distance d measured between the ends of two circumferentially consecutive sections 6 is equal to 65 mm.

The layer 42 thus produced makes it possible to obtain a lower circumferential rigidity in the central part 422 by comparison with the circumferential rigidities of the axially outer parts 421.

Figure 3:
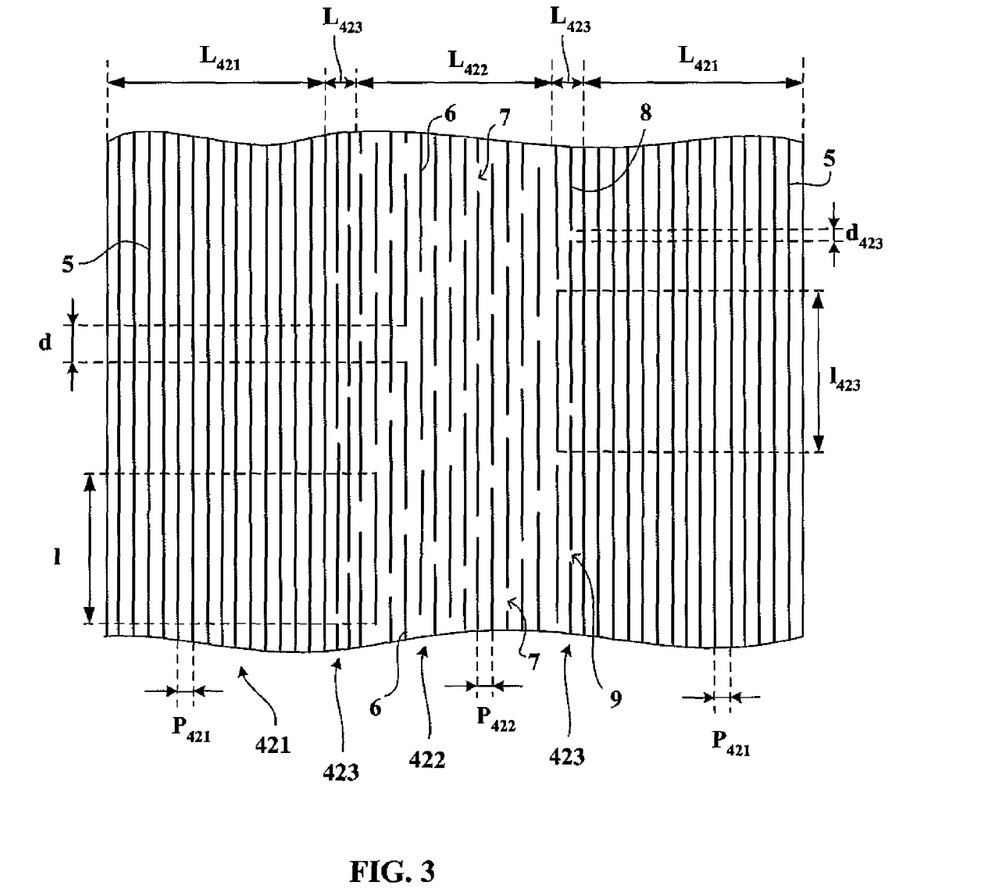
FIG. 3: a schematic depiction of one layer of circumferential reinforcing elements according to a second embodiment of the invention.

FIG. 3 illustrates a second embodiment of a layer of circumferential reinforcing elements 42 according to the invention. In addition to the central part 422 and to the axially outer parts 421, the layer 42 comprises two intermediate regions 423 situated axially between the central part 422 and each of the axially outer parts 421.

The axial width $L_{423}$ is equal to 4.5 mm. The axial width of the central part $L_{422}$ is equal to 173 mm and the axial widths $L_{421}$ of the axially outer parts 421 are equal to 61 mm.

The length of the sections 6 and the distance of the gaps 7 of the central part 422 are identical to those of FIG. 2.

The sections 8 of the intermediate regions 423 have a length $l_{423}$ equal to 132 mm and two sections 8 are separated by a gap 9 of which the distance $d_{423}$ measured between the ends of two circumferentially consecutive sections 8 is equal to 35 mm.

These values show that the sections 8 of the intermediate regions 423 are longer than the sections 6 of the central part 422 and also separated by gaps which are shorter than the length of the gaps in the central part 422. The circumferential rigidity in these intermediate regions is thus higher than that of the central part. This then yields a more progressive variation in circumferential rigidity in the axial direction of the layer of circumferential reinforcing elements 42.

Figure 4:
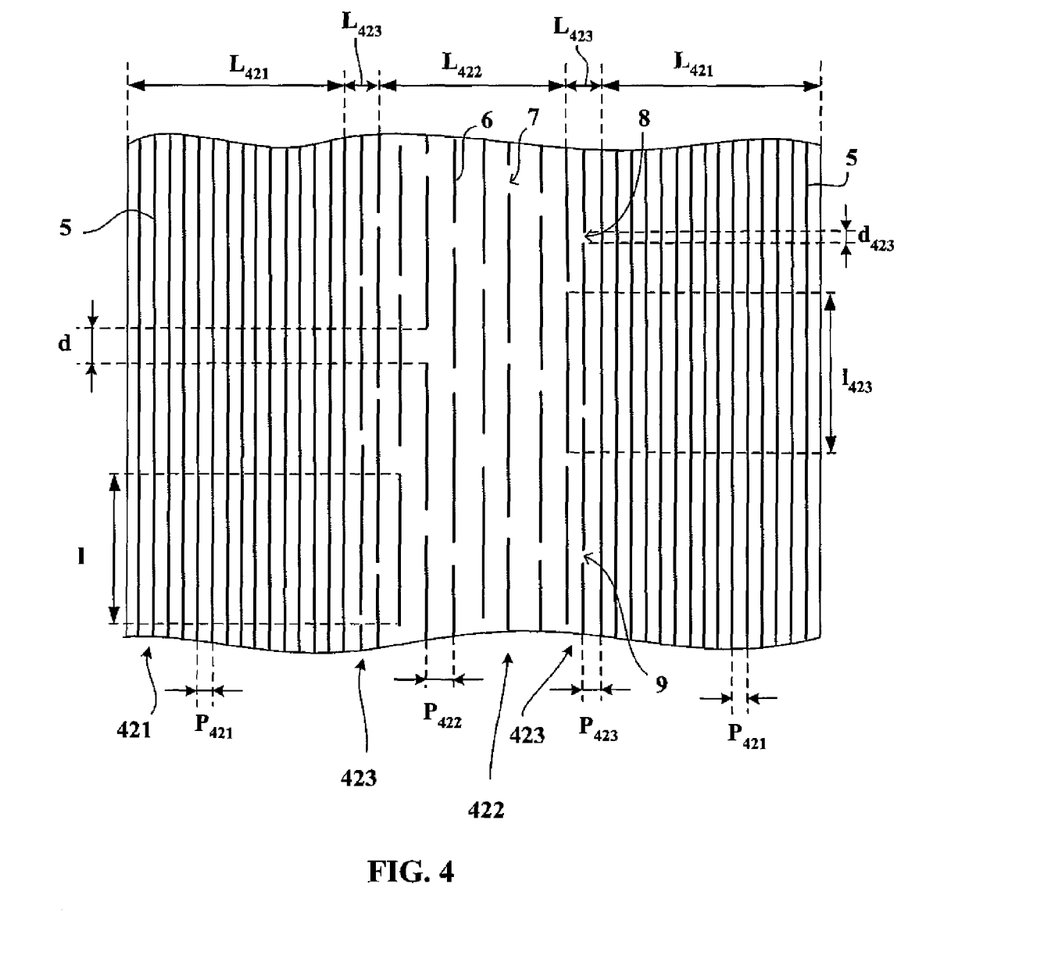
FIG. 4: a schematic depiction of one layer of circumferential reinforcing elements according to a third embodiment of the invention.

FIG. 4 illustrates a third embodiment of a layer of circumferential reinforcing elements 42 according to the invention. As was the case with FIG. 3, it comprises two intermediate regions 423 situated axially between the central part 422 and each of the axially outer parts 421.

The axial widths $L_{423}$, $L_{422}$, and $L_{421}$ are identical to those of FIG. 3.

The length of the sections 6 and the length of the gaps 7 in the central part 422 are identical to those of FIGS. 2 and 3.

The length of the sections 8 and the distance of the gaps 9 of the intermediate regions 423 are identical to those of FIG. 3.

The spacing $P_{421}$ at which the circumferential reinforcing elements 5 of the axially outer parts 421 are laid is identical to that of FIG. 1 and equal to 2.3 mm.

The circumferential reinforcing elements which have been cut and which form sections 6 in the central part are laid at a spacing $P_{422}$ equal to 2.9 mm. This greater spacing at which they are laid in the central part plays a part in reducing the circumferential rigidity of the said central part 422 by comparison with the axially outer parts 421.

The spacing at which the cut circumferential reinforcing elements that form sections 8 in the intermediate regions 423 are laid is equal to 2.5 mm. The spacing at which these intermediate regions 423 are laid is a value intermediate between those of the axially outer parts 421 and that of the central part 422. These values contribute to the progressiveness of the variation of the circumferential rigidity in the axial direction of the layer of circumferential reinforcing elements 42.

According to other alternative forms of embodiment of the invention, the spacing in the intermediate regions 423 could be at a value identical to that of the spacing of the central part or alternatively to that of the spacing of the axially outer part or parts, with only the lengths of the sections and the lengths of the gaps between sections evolving progressively.

Other alternative forms still may provide a progressive evolution in the spacing in the intermediate regions combined either with circumferential reinforcing elements that are continuous as in the axially outer parts 421 or reinforcing elements that have been cut with section lengths and lengths of gaps between sections that are identical to those of the central part 422.

Figure 5:
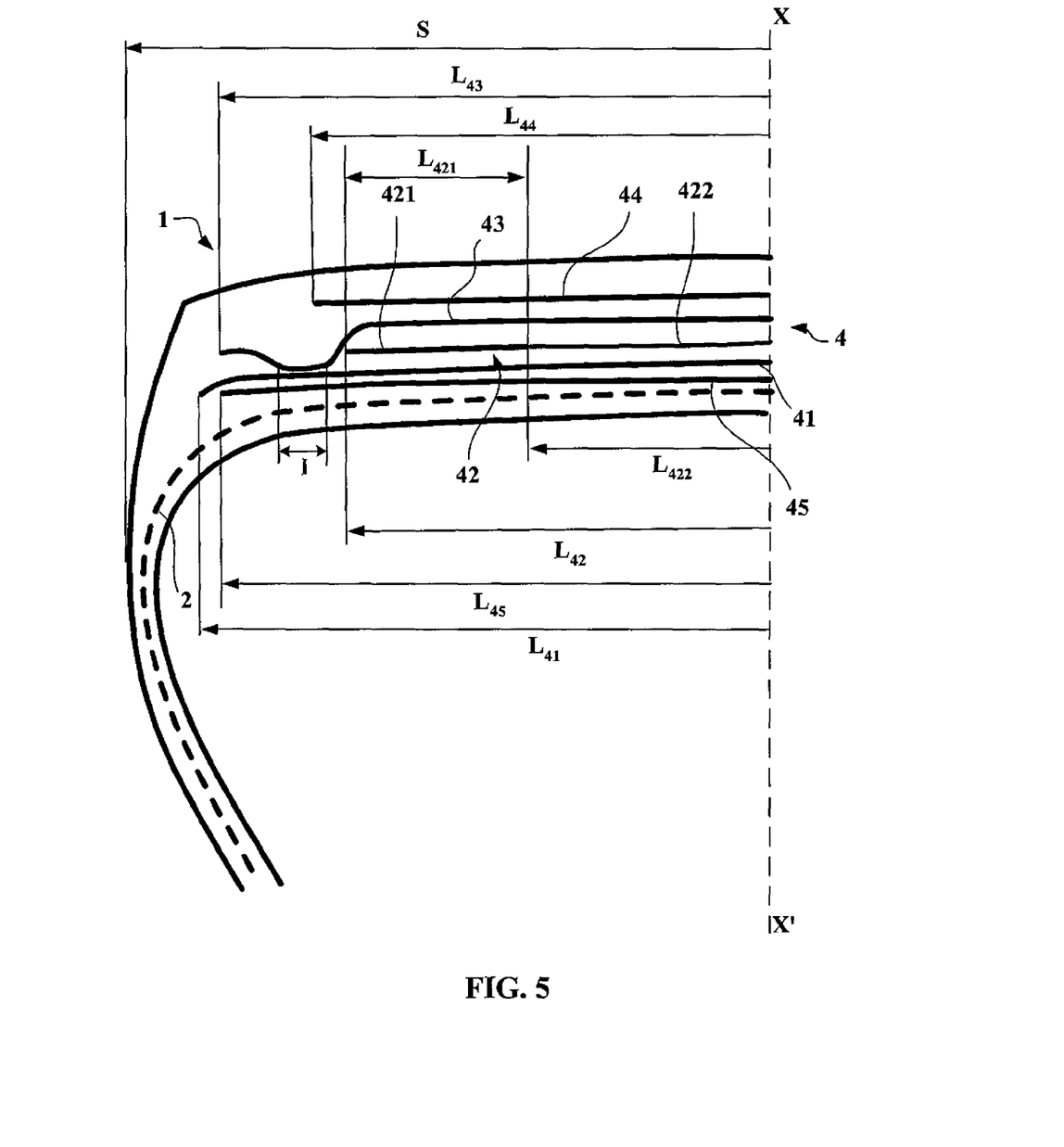
FIG. 5: a schematic meridian view of a tire according to an alternative form of embodiment of the invention.

In FIG. 5, the tire 1 differs from that depicted in FIG. 1 in that the two working layers 41 and 43 are, on each side of the equatorial plane and axially in the continuation of the layer of circumferential reinforcing elements 42, coupled over an axial width 1: the cords of the first working layer 41 and the cords of the second working layer 43, over an axial width 1 of coupling of the two layers, are separated radially from one another by a layer of rubber the thickness of which is minimal and corresponds to twice the thickness of the rubber calendaring layer of the unwrapped 11.35 metal cords of which each working layer 41, 43 is made, namely 0.8 mm. Over the remainder of the width common to the two working layers, the two working layers 41, 43 are separated by a rubber profiled element, not depicted in the figure, the thickness of the said profiled element increasing from the axial end of the coupling region to the end of the narrowest working layer. The said profiled element is advantageously wide enough that it radially overlaps the end of the widest working layer 41 which, in this case, is the working layer radially closest to the carcass reinforcement.

Tests have been conducted on the tire produced according to the invention in accordance with the depiction of FIG. 1 and compared against a reference tire that was identical but produced with a conventional configuration.

This reference tire comprises a layer of circumferential reinforcing elements consisting of the same cord, laid at the same spacing and having no part with elements that have been cut to form sections. The circumferential rigidity of the layer of reinforcing elements is thus uniform across its entire axial width.

First endurance tests were conducted by fitting identical vehicles with each of the tires and having each of the vehicles run in a straight line, the tires being subjected to loadings grater than the nominal load in order to accelerate this type of test.

The vehicles were associated with a load of 4000 kg per tire.

Other endurance tests were run on a test machine that imposed a load and a cornering angle on the tires. The tests were conducted on the tires according to the invention with a load and a cornering angle that were identical to those applied to the reference tires.

The tests thus conducted demonstrated that the distances covered in each of these tests were substantially the same for the tires according to the invention and for the reference tires. It would therefore appear that the tires according to the invention have a performance which is substantially equivalent in terms of endurance to the reference tires.

Finally, further running tests were conducted on unasphalted roads exhibiting reliefs that simulate the presence of stones that are particularly harmful to tire treads.

This last series of tests showed that after identical distances covered the tires according to the invention displayed less severe damage.

The invention as has just been described notably with reference to the exemplary embodiments must not be understood as being restricted to these embodiments. For example, the layer of circumferential reinforcing elements could, while still falling within the scope of the invention, consist of more than five parts in order to display even more progressive variations in circumferential rigidity.

The invention claimed is:

1. A tire with radial carcass reinforcement, the tire comprising radially outward of the carcass reinforcement a crown reinforcement formed of at least two working crown layers of inextensible reinforcing elements, crossed from one layer to the other and making angles of between 10° and 45° with the circumferential direction, and itself radially capped by a tread, said tread being connected to two beads by two sidewalls, the crown reinforcement comprising a layer of circumferential metal reinforcing elements;

wherein the layer of circumferential reinforcing elements includes a central part and two axially outermost parts;

wherein the reinforcing elements of the central part of the layer of circumferential metal reinforcing elements are reinforcing elements that are cut into sections;

wherein the length of the sections is less than 550 mm;

wherein the distance between the ends of two consecutive sections is greater than 25 mm;

wherein the length of the sections is between 1.1 and 13 times the distance between the ends of two consecutive sections;

wherein the reinforcing elements of the two axially outermost parts are continuous;

wherein the layer of circumferential metal reinforcing elements comprises a region of transition between the central part and each axially outermost part;

wherein said transition regions each comprise at least one metal reinforcing element; and wherein the width, measured in the axial direction, of each of said transition regions is at least equal to 1.5 mm, each transition region having a circumferential rigidity intermediate between that of the central part and that of the adjacent axially outermost part.

2. The tire according to claim 1, wherein the length of the sections is less than 300 mm, and wherein the length of the sections is less than 6.5 times the distance between the ends of two consecutive sections.

3. The tire according to claim 1, wherein the length of the sections is greater than 95 mm.

4. The tire according to claim 1, wherein the distance between the ends of two consecutive sections is less than 175 mm.

5. The tire according to claim 1, wherein S is a maximum axial width of the tire when the tire is mounted on its service rim and inflated to its recommended pressure, and wherein the axial width of the central part of the layer of circumferential metal reinforcing elements is greater than 0.15×S and less than 0.5×S.

6. The tire according to claim 1, wherein S is a maximum axial width of the tire when the tire is mounted on its service rim and inflated to its recommended pressure, and wherein the axial width of each of the axially outer parts of the layer of circumferential metal reinforcing elements is less than 0.45×S.

7. The tire according to claim 1, wherein the circumferential length of the sections decreases from the axially outer edge of a transition region towards the axially inner edge thereof and/or wherein the distance between the ends of two consecutive sections increases from the axially outermost edge of a transition region towards the axially innermost edge thereof.

8. The tire according to claim 1, wherein two axially adjacent, circumferential metal reinforcing elements, which consist of reinforcing elements that are cut to form sections, do not have regions of cutting that axially face one another.

9. The tire according to claim 8, wherein the ends of two adjacent sections are separated from one another in the longitudinal direction by a distance greater than 0.1 times the length of that section which has the shortest length measured in the longitudinal direction.

10. The tire according to claim 1, wherein the layer of circumferential reinforcing elements is arranged radially between two working crown layers.

11. The tire according to claim 1, wherein the reinforcing elements of at least the two axially outer parts of the layer of circumferential metal reinforcing elements are metal reinforcing elements having a secant modulus at 0.7% elongation of between 10 and 120 GPa and a maximum tangent modulus of less than 150 GPa.

12. The tire according to claim 1, wherein the reinforcing elements of at least the two axially outer parts of the layer of circumferential metal reinforcing elements are metal reinforcing elements having a tensile stress-strain curve that exhibits shallow gradients for small elongations and a substantially constant and steep gradient for greater elongations.

13. The tire according to claim 1, wherein the crown reinforcement is supplemented radially on the outside by at least one additional ply of reinforcing elements said to be elastic reinforcing elements, which are directed with respect to the circumferential direction at an angle of between 10° and 45° and in the same direction as the angle formed by the inextensible elements of the working ply radially adjacent to it.

14. The tire according to claim 1, wherein the crown reinforcement further comprises, radially on the inside between the carcass reinforcement and the radially inner working layer closest to the carcass reinforcement, a triangulation layer formed of metal reinforcing elements that form angles greater than 45° with the circumferential direction.

* * * * *